US011790045B2

(12) United States Patent
Shetty et al.

(10) Patent No.: US 11,790,045 B2
(45) Date of Patent: Oct. 17, 2023

(54) AUTO-TAGS WITH OBJECT DETECTION AND CROPS

(71) Applicant: ADOBE INC., San Jose, CA (US)

(72) Inventors: Shipali Shetty, San Jose, CA (US); Zhe Lin, Bellevue, WA (US); Alexander Smith, Orange, NH (US)

(73) Assignee: ADOBE, INC., San Jose, CA (US)

( * ) Notice: Subject to any disclaimer, the term of this patent is extended or adjusted under 35 U.S.C. 154(b) by 201 days.

(21) Appl. No.: 17/240,246

(22) Filed: Apr. 26, 2021

(65) Prior Publication Data

US 2022/0343108 A1 Oct. 27, 2022

(51) Int. Cl.
*G06F 18/22* (2023.01)
*G06T 7/00* (2017.01)
*G06V 10/75* (2022.01)

(52) U.S. Cl.
CPC ............ *G06F 18/22* (2023.01); *G06T 7/0002* (2013.01); *G06V 10/75* (2022.01); *G06T 2207/20132* (2013.01); *G06T 2210/12* (2013.01)

(58) Field of Classification Search
None
See application file for complete search history.

(56) References Cited

U.S. PATENT DOCUMENTS 7,447,384 B2 * 11/2008 Kitora .................. H04N 9/8047 382/233
2020/0005063 A1 * 1/2020 Ralls ....................... G06F 16/51
2022/0139004 A1 * 5/2022 Steinberg ............. A61B 5/0095 382/128

* cited by examiner

*Primary Examiner* — Tahmina N Ansari
(74) *Attorney, Agent, or Firm* — F. CHAU & ASSOCIATES, LLC

(57) ABSTRACT

Systems and methods for image tagging are described. In some embodiments, images with problematic tags are identified after applying an auto-tagger. The images with problematic tags are then sent to an object detection network. In some cases, the object detection network is trained using a training set selected to improve detection of objects associated with the problematic tags. The output of the object detection network can be merged with the output of the auto-tagger to provide a combined image tagging output. In some cases, the output of the object detection network also includes a bounding box, which can be used to crop the image around a relevant object so that the auto-tagger can be reapplied to a portion of the image.

19 Claims, 8 Drawing Sheets

AUTO-TAGS WITH OBJECT DETECTION AND CROPS

BACKGROUND

The following relates generally to image processing, and more specifically to image tagging.

Image processing refers to the use of a computer to digitally modifying an image, e.g., to achieve a more aesthetically pleasing image. In digital image processing, an image may be tagged and indexed based on the subject matter of an image. For examples, objects or attributes of the image can be identified and the image can be labeled accordingly.

In some cases, an auto-tagging process is used to apply tags or keywords to the image. An auto-tagging system can include a neural network that is trained to recognize a predetermined set of tags. For example, an image of a dog in a park may derive keywords such as 'dog', 'outside', 'tree', or 'grass'. However, in some cases an auto-tagger will does not reliably detect certain tags. These tags are referred to as "problematic tags."

An auto-tagging system can be retrained to increase performance with respect to problematic tags. However, retraining can be expensive and time-consuming Therefore, there is a need in the art for an image tagging system that can accurately identify problematic tags without retraining an auto-tagger.

SUMMARY

The present disclosure provides systems and methods for image tagging. In some embodiments, images with problematic tags are identified after applying an auto-tagger. The images with problematic tags are then sent to an object detection network. In some cases, the object detection network is trained using a training set selected to improve detection of objects associated with the problematic tags. The output of the object detection network can be merged with the output of the auto-tagger to provide a combined image tagging output. In some cases, the output of the object detection network also includes a bounding box, which can be used to crop the image around a relevant object so that the auto-tagger can be reapplied to a portion of the image.

A method, apparatus, non-transitory computer-readable medium, and system for image tagging are described. One or more embodiments of the method, apparatus, non-transitory computer-readable medium, and system include receiving an image, identifying an attribute tag for the image and an attribute tag confidence score for the attribute tag using an auto-tagger, selecting the image for additional processing based on the attribute tag, identifying an object in the image and an object confidence score for the object using an object detection network based on the selection, computing an updated attribute tag confidence score based on the attribute tag confidence score and the object confidence score, and transmitting the updated attribute confidence score.

An apparatus, system, and method for image tagging are described. One or more embodiments of the apparatus, system, and method include an auto-tagger configured to identifying an attribute tag for an image and an attribute tag confidence score for the attribute tag, a problematic tag component configured to select the image for additional processing based on the attribute tag, an object detection network configured to identify an object in the image and an object confidence score for the object, and a tag merging component configured to compute an updated attribute tag confidence score based on the attribute tag confidence score and the object confidence score.

A method, apparatus, non-transitory computer-readable medium, and system for training a neural network for image tagging are described. One or more embodiments of the method, apparatus, non-transitory computer-readable medium, and system include identifying attribute tags for a plurality of images using an auto-tagger, identifying a set of problematic tags based on the identified attribute tags, selecting a training set for an object detection network based on the set of problematic tags, wherein the training set includes images with objects corresponding to the problematic tags, and training the object detection network using the training set.

DETAILED DESCRIPTION

Figure 1:
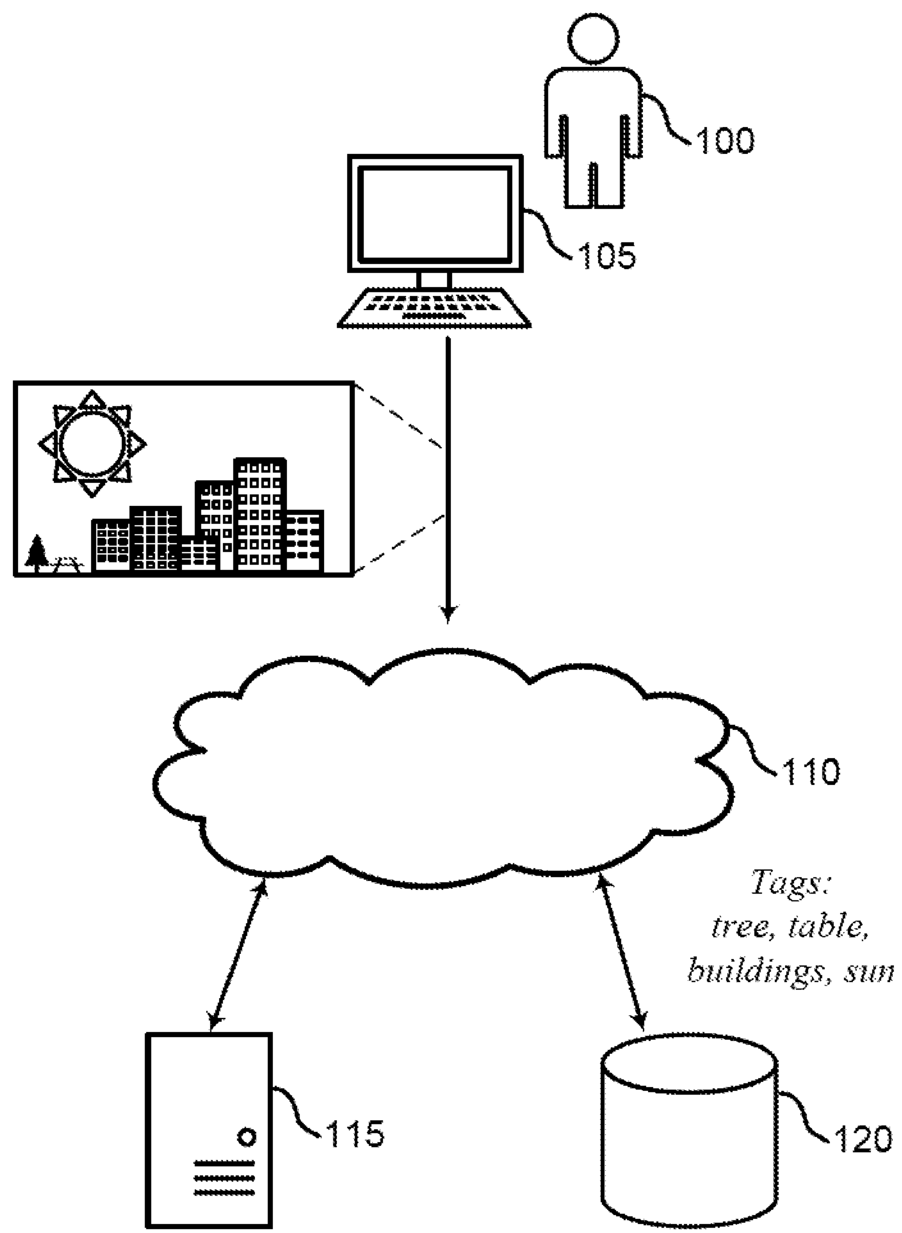
FIG. 1 shows an example of an auto-tagging diagram according to aspects of the present disclosure.

The present disclosure provides systems and methods for image tagging. In some embodiments, images with problematic tags are identified after applying an auto-tagger. The images with problematic tags are then sent to an object detection network. In some cases, the object detection network is trained using a training set selected to improve detection of objects associated with the problematic tags. The output of the object detection network can be merged with the output of the auto-tagger to provide a combined image tagging output. In some cases, the output of the object detection network also includes a bounding box, which can be used to crop the image around a relevant object so that the auto-tagger can be reapplied to a portion of the image.

Auto-tagging refers to the process for determining keywords associated with an image. In some examples, an image-tagging process identifies potential keywords and provides a confidence score for each keyword. If a keyword is determined to have a confidence score above a predetermined threshold, the system will assign that keyword as a label or tag for the image. If a keyword is determined not to have a confidence score above the predetermined threshold, the system will not assign that keyword to the image. In some cases, an auto-tagger includes a neural network classifier that provides a confidence score for each of a plurality of predetermined tags.

Object detection refers to the process of classifying objects using categorical labels and localizing the objects in an image. For example, unlike an auto-tagger, an object detection network may provide bounding boxes around detected objects. However, an object detection network may not detect non-object attributes such as actions, sentiments, colors, etc.

In some cases, auto-tagging systems performs poorly on blurry images, unfamiliar objects, or objects with undesirable orientations. Traditionally, if an image-tagging model performs poorly identifying a category of objects, the model is retrained to better recognize the problematic tag. However, this process can be expensive time-consuming because training an auto-tagging system often depends on a large amount of training data.

The present disclosure describes systems and methods that enable incremental improvement in the performance of an image tagging system. Embodiments of the present disclosure include an auto-tagging network, a problematic tag component for identifying images with problematic tags, an object detection network, and a tag merging component to merge the output of the auto-tagging network and the object detection network.

By applying the unconventional step of identifying images with problematic tags and sending them to a separate object detection network, the accuracy of the overall image tagging system can be improved incrementally without retraining an auto-tagger. In some cases different object detection networks may be trained and used to detect objects associated with different problematic tags. In some cases, a bounding box output of the object detection network may be used to crop the image and reapply the auto-tagger on the cropped image.

Embodiments of the present disclosure may be used in the context of an image tagging system such as a system for uploading and indexing images for an image database. An example of an application of the inventive concept in the image tagging context is provided with reference to FIGS. 1 and 2. Details regarding the architecture of an example object detection network are provided with reference to FIGS. 3 and 4. An example process for identifying image tags is provided with reference to FIGS. 5 and 6. A description of an example training process is described with reference to FIGS. 7 and 8.

Image Tagging Application

FIG. 1 shows an example of an auto-tagging diagram according to aspects of the present disclosure. The example shown includes user 100, user device 105, cloud 110, image-tagging apparatus 115, and database 120. User 100 is an example of, or includes aspects of, the corresponding element described with reference to FIG. 4.

In the example scenario of FIG. 1, an input image may include objects such as buildings, trees, or a natural environment. The image may be uploaded for indexing and storage in a database 120. The image-tagging apparatus 115 recognizes attributes in the image and provides keywords (i.e., labels or tags) associated with the attributes. In some cases, the attributes correspond to objects. If the image-tagging apparatus 115 determines that the image includes one or more unreliable tags associated with one or more objects, the image is processed by an object detection network (an in some cases, at a higher resolution) to produce updated tags. The original and updated tags are then merged (i.e., a combined confidence score is computed), and the image is indexed, and stored in the database 120.

The user 100 communicates with the image-tagging apparatus 115 via the user device 105 and the cloud 110. The device 105 transmits the document to the image-tagging apparatus 115. In some examples, the user device 105 communicates with the image-tagging apparatus 115 via the cloud 110.

Embodiments of the present disclosure provide continuous enhancement in image-tagging of images using object detection model, image crops and the existing image-tagging models. Tags are improved for the problematic categories or areas incrementally since repeated retraining of new models does not work well. Therefore, embodiments of the present disclosure avoid model replacement and reindexing of images.

In some cases, model retraining is performed with a new set of training data that includes more examples for the problematic categories and replaces old models with newly retrained models—reindexing and regenerating image-tags for customer assets with newly trained models are not feasible solutions in production due to the expense and time consumption.

The user device 105 may be a personal computer, laptop computer, mainframe computer, palmtop computer, personal assistant, mobile device, or any other suitable processing apparatus. In some examples, the user device 105 includes software that incorporates an image-tagging system and an object detection system (i.e., an image editing software).

A cloud 110 is a computer network configured to provide on-demand availability of computer system resources, such as data storage and computing power. In some examples, the cloud 110 provides resources without active management by the user 100. The term cloud 110 is sometimes used to describe data centers available to many users 100 over the Internet. Some large cloud 110 networks have functions distributed over multiple locations from central servers. A server is designated an edge server if it has a direct or close connection to a user 100. In some cases, the cloud 110 is limited to a single organization. In other examples, the cloud 110 is available to many organizations. In one example, a cloud 110 includes a multi-layer communications network comprising multiple edge routers and core routers. In another example, a cloud 110 is based on a local collection of switches in a single physical location.

Image-tagging apparatus 115 is an example of, or includes aspects of, the corresponding element described with reference to FIG. 3. The image tagging apparatus performs image tagging and provides one or more updated image tags that may be determined to be unreliable. The image tagging apparatus may be trained using the updated attribute tags and updated confidence scores to iteratively update the image tagging apparatus of the present disclosure.

A database 120 is an organized collection of data. For example, a database 120 stores data in a specified format known as a schema. A database 120 may be structured as a single database 120, a distributed database 120, multiple distributed databases 120, or an emergency backup database 120. In some cases, a database 120 controller may manage data storage and processing in a database 120. In some cases, a user 100 interacts with database 120 controller. In other cases, database 120 controller may operate automatically without user 100 interaction. The database 120 may be configured to store the image based on the indexing. According to some embodiments, database 120 stores the indexed image and is configured to store the image based on the indexing. Database 120 is an example of, or includes aspects of, the corresponding element described with reference to FIG. 4.

Figure 2:
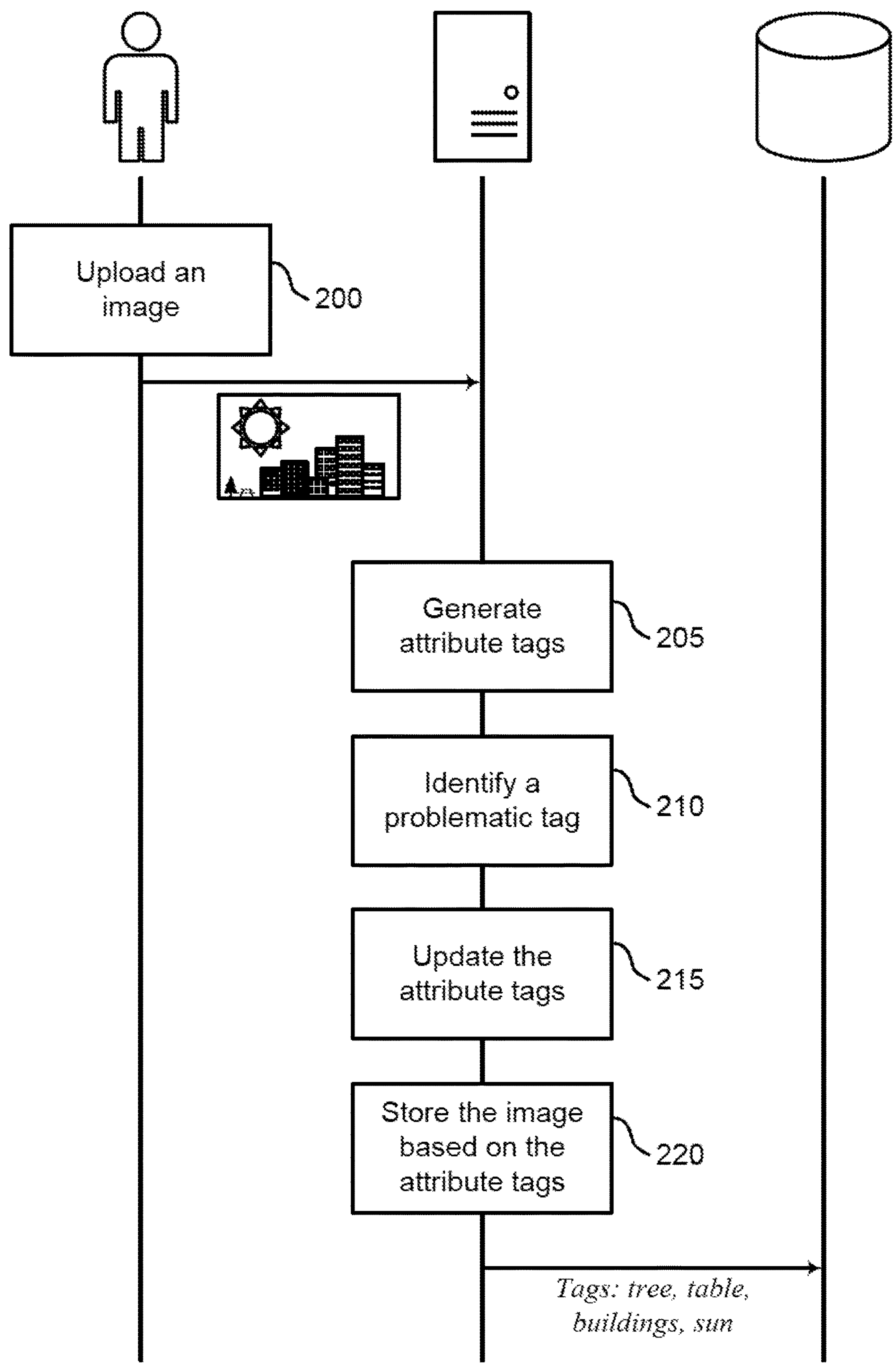
FIG. 2 shows an example of an image-tagging process according to aspects of the present disclosure.

FIG. 2 shows an example of an image-tagging process according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

The present disclosure describes an incremental method of combining multiple models to enhance the overall accuracy or performance. Embodiments of the disclosure combine a lightweight (i.e., smaller) model developed for a specific area with a model that works well in other areas. The results of the two models are combined using a normalization technique or algorithm. Some embodiments result in cost and performance improvement, easier model evaluation and testing since new categories (i.e., not all categories) are tested due to the incremental enhancement of the model.

Machine learning models are not 100% accurate. Thus, in some cases, machine learning models are periodically retrained with more data to get improved results. However, ins some cases, replacement of the machine learning model is not a feasible option since retraining a model and re-running the assets is expensive and time consuming. One or more embodiments of the present disclosure combine an existing auto-tagging model with object detection model that performs well for the problematic categories. This can increase the overall accuracy of the system while avoiding total replacement of the model.

An attribute, a tag, or an attribute tag refer to a keyword associated with an image or an object in an image, which can be determined automatically by an auto-tagging process. In some cases, an image or object may include multiple attribute tags.

A confidence score is used to provide a measurement of accuracy or confidence for a given attribute tag (or for the results of an object detection). In some examples, a high confidence score is an indication that the valuation is accurate, whereas a low confidence score is an indication that the valuation is inaccurate. In a predictive model context, confidence scores can be used to measure the accuracy of predictions made by a predictive model. In some cases, a low confidence score may be used to identify problematic tags. In other examples, human feedback is used to identify problematic tags independent of the confidence score (i.e., the confidence score itself may be inaccurate).

At operation 200, the system uploads an image. In the example of FIG. 1, an image of buildings, a tree, a table, and the sun are uploaded to the system. In some cases, the operations of this step refer to, or may be performed by, a user as described with reference to FIGS. 1 and 4.

At operation 205, the system generates attribute tags. The attribute tags may refer to keywords associated with objects in an image, which are determined by an auto-tagger component. In the example of FIG. 1, the image may return an attribute tag such as 'tree', 'table', 'buildings', and 'sun'. In some cases, the operations of this step refer to, or may be performed by, an image-tagging apparatus as described with reference to FIGS. 1 and 3.

At operation 210, the system identifies a problematic tag. The problematic tag may be an attribute tag below a confidence score threshold. In some cases, the operations of this step refer to, or may be performed by, an image-tagging apparatus as described with reference to FIGS. 1 and 3.

At operation 215, the system updates the attribute tags. The system uses an original attribute tag score, associated with an attribute tag, and a problematic tag score, associated with a problematic tag of the same object and combines the tags to provide an updated tag. In some cases, the combined scores may be averaged. In some cases, the operations of this step refer to, or may be performed by, an image-tagging apparatus as described with reference to FIGS. 1 and 3.

At operation 220, the system stores the image based on the attribute tags. The image, image crops, final attribute tag, and all scores are stored in the database. In some cases, the operations of this step refer to, or may be performed by, an image-tagging apparatus as described with reference to FIGS. 1 and 3.

System Architecture

Figure 3:
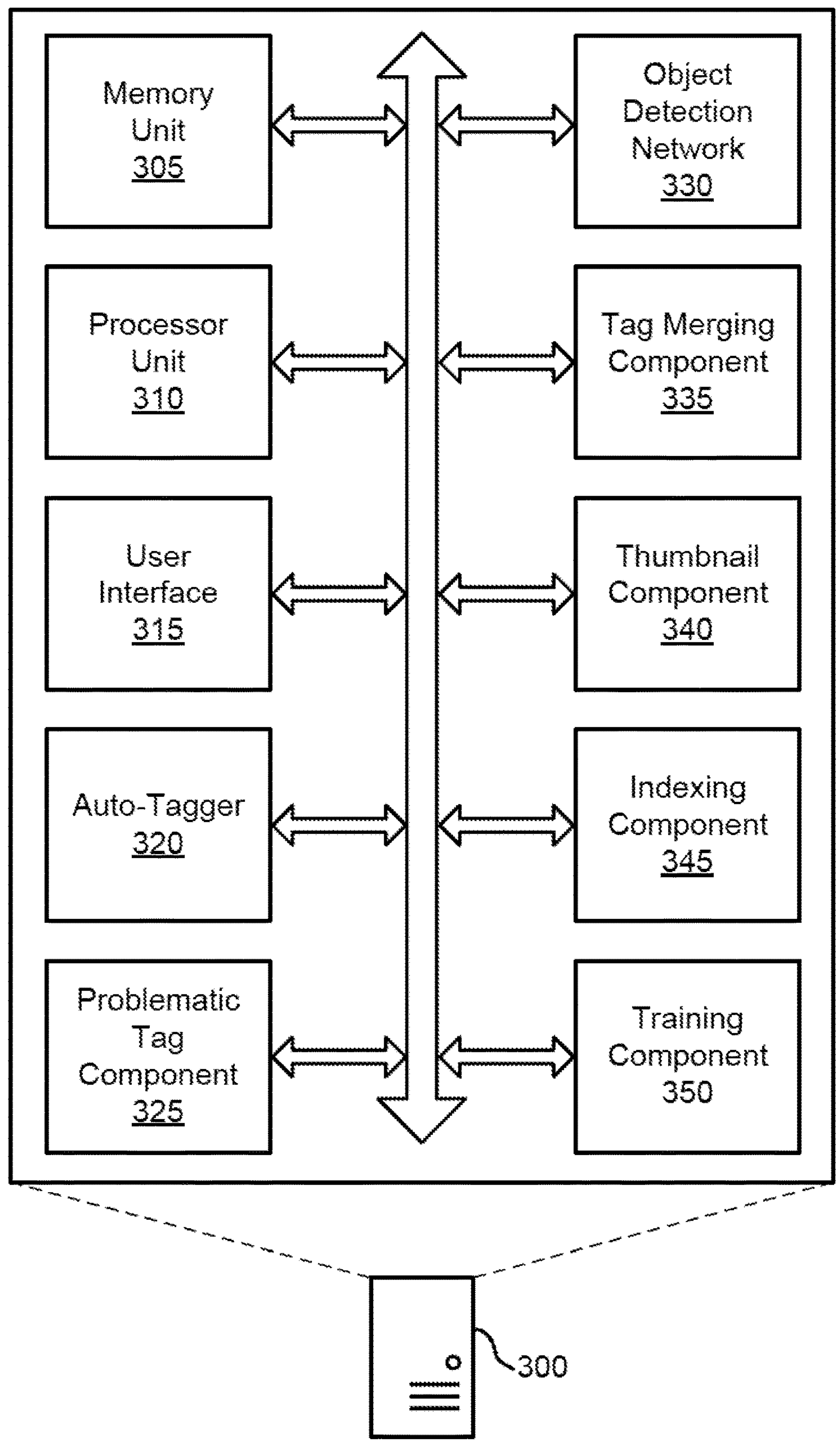
FIG. 3 shows an example of an image-tagging apparatus according to aspects of the present disclosure.
Figure 4:
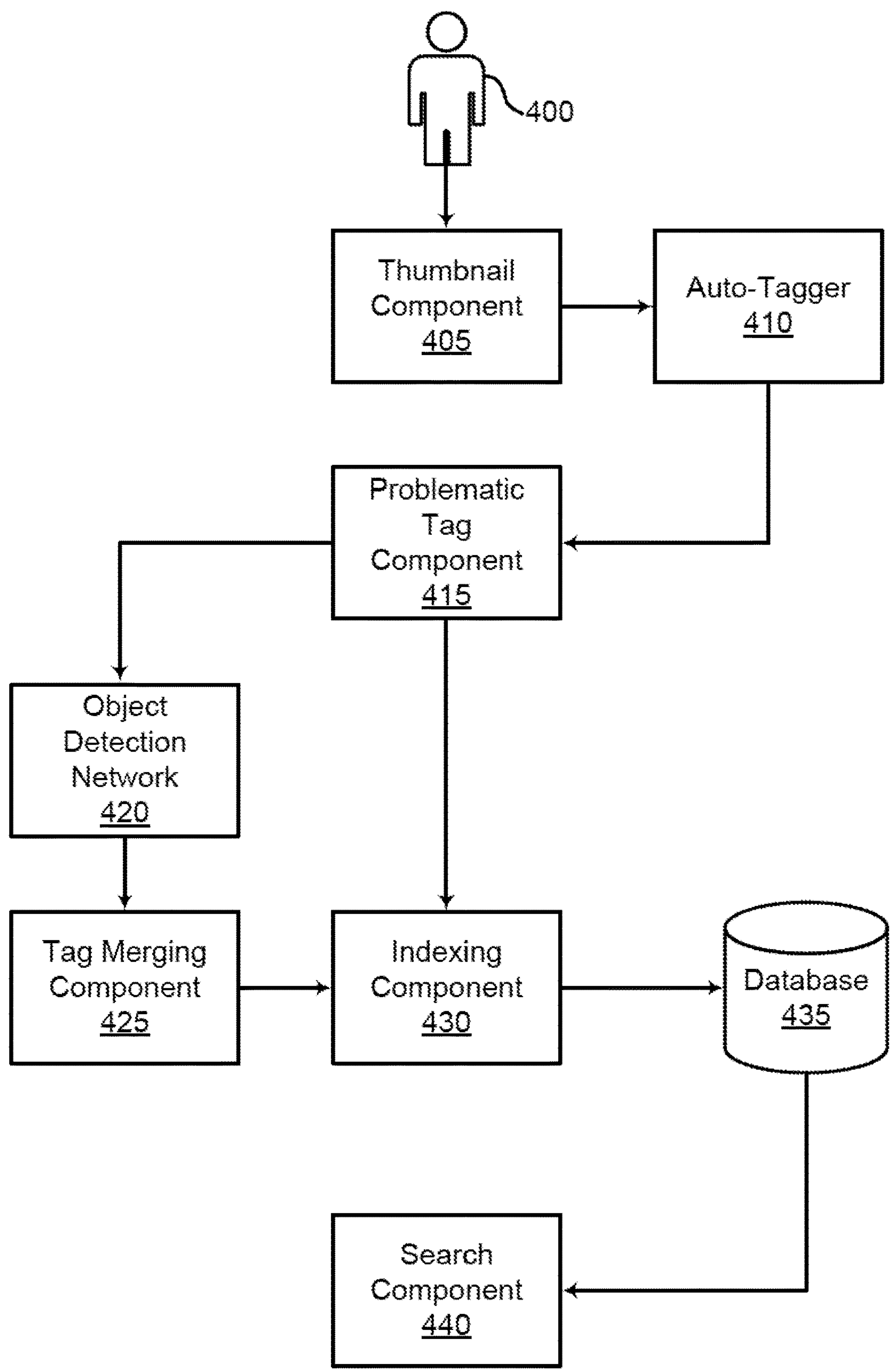
FIG. 4 shows an example of an image-tagging diagram according to aspects of the present disclosure.

In FIGS. 3 and 4, an apparatus, system, and method for image-tagging are described. One or more embodiments of the apparatus, system, and method include an auto-tagger configured to identifying an attribute tag for an image and an attribute tag confidence score for the attribute tag, a problematic tag component configured to select the image for additional processing based on the attribute tag, an object detection network configured to identify an object in the image and an object confidence score for the object, and a tag merging component configured to compute an updated attribute tag confidence score based on the attribute tag confidence score and the object confidence score.

Search indexing is the process of structuring and parsing data to provide fast and accurate information retrieval. Files such as music, images, and text may be indexed based on associated tags or vector representations. When search indexing is performed, a computer program can search a large amount of information in a short period of time because the tags or vectors are compared rather than the information in the file itself.

Some examples of the apparatus, system, and method described above further include a thumbnail component configured to produce a low-resolution version of the image and an indexing component configured to index the image based on the updated attribute tag confidence score. Some examples further include a database configured to store the image based on the indexing.

Some examples of the apparatus, system, and method described above further include a search component configured to retrieve the image from the database based on the indexing. In some examples, the object detection network is configured to produce a bounding box for the object.

FIG. 3 shows an example of an image-tagging apparatus 300 according to aspects of the present disclosure. The example shown includes an image-tagging apparatus 300 includes memory unit 305, processor unit 310, user interface 315, auto-tagger 320, problematic tag component 325, object detection network 330, tag merging component 335, thumbnail component 340, indexing component 345, and training component 350. Image-tagging apparatus 300 is an example of, or includes aspects of, the corresponding element described with reference to FIG. 1.

Examples of a memory unit 305 include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

A processor unit 310 is an intelligent hardware device, (e.g., a general-purpose processing component, a digital signal processor (DSP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special-purpose components for modem processing, baseband processing, digital signal processing, or transmission processing.

According to some embodiments, the user interface 315 may enable a user to interact with a device. In some embodiments, the user interface may include an audio device, such as an external speaker system, an external display device such as a display screen, or an input device (e.g., remote control device interfaced with the user interface directly or through an IO controller module). In some cases, a user interface may be a graphical user interface (GUI).

According to some embodiments, auto-tagger 320 receives an image. In some examples, auto-tagger 320 identifies an attribute tag for the image and an attribute tag confidence score for the attribute tag using an auto-tagger 320. In some examples, auto-tagger 320 identifies an additional attribute tag confidence score for the attribute tag by reapplying the auto-tagger 320 to the cropped image, where the updated attribute tag confidence score is based on the additional attribute tag confidence score.

According to some embodiments, auto-tagger 320 is configured to identify an attribute tag for an image and an attribute tag confidence score for the attribute tag. Auto-tagger 320 is an example of, or includes aspects of, the corresponding element described with reference to FIG. 4.

According to some embodiments, problematic tag component 325 selects the image for additional processing based on the attribute tag. In some examples, problematic tag component 325 identifies a set of problematic tags. In some examples, problematic tag component 325 determines that the attribute tag is included in the set of problematic tags, where the image is selected for additional processing based on the determination. In some examples, problematic tag component 325 determines an attribute frequency for each of a set of tags, where the set of problematic tags is identified based on the attribute frequency. In some examples, problematic tag component 325 determines that attribute tag does not correspond to any detectable object in a list of objects detectable by the object detection network 330. In some examples, problematic tag component 325 retains the attribute tag confidence score for the attribute tag based on the determination.

According to some embodiments, problematic tag component 325 is configured to select the image for additional processing based on the attribute tag and determines an attribute frequency for each of the attribute tags, where a set of problematic tags is identified based on the attribute frequency. Problematic tag component 325 is an example of, or includes aspects of, the corresponding element described with reference to FIG. 4.

According to some embodiments, object detection network 330 identifies an object in the image and an object confidence score for the object using an object detection network 330 based on the selection. In some examples, object detection network 330 identifies a bounding box for the object using the object detection network 330. In some examples, object detection network 330 crops the image based on the bounding box. In some examples, object detection network 330 determines that the object corresponds to the attribute tag.

According to some embodiments, object detection network 330 is configured to identify an object in the image and an object confidence score for the object. In some examples, the object detection network 330 is configured to produce a bounding box for the object and detects objects in a training set. In some examples, object detection network 330 identifies an object in the image and an object confidence score for the object based on a selection. Object detection network 330 is an example of, or includes aspects of, the corresponding element described with reference to FIG. 4.

According to some embodiments, tag merging component 335 computes an updated attribute tag confidence score based on the attribute tag confidence score and the object confidence score. In some examples, tag merging component 335 transmits the updated attribute confidence score. Tag merging component 335 is an example of, or includes aspects of, the corresponding element described with reference to FIG. 4.

In some examples, the tag merging component 335 multiplies the object confidence score by a boost parameter to produce a weighted object confidence score (i.e., if an object corresponding to the tag is identified by the object detection network 330). In some examples, tag merging component 335 adds the attribute tag confidence score and the weighted object confidence score to produce the updated attribute tag confidence score.

In some cases, the tag merging component 335 determines that an object identified by the object detection network 330 does not correspond to the attribute tag. In this case, the tag merging component 335 can penalize or reduce the confidence score of the attribute tag. In some examples, tag merging component 335 retains the attribute tag confidence score for the attribute tag.

According to some embodiments, thumbnail component 340 receives a high-resolution version of the image and generates a low-resolution version of the image, where the attribute tag is identified based on the low-resolution version and the object is identified based on the high-resolution version. According to some embodiments, thumbnail component 340 is configured to produce a low-resolution version of the image. Thumbnail component 340 is an example of, or includes aspects of, the corresponding element described with reference to FIG. 4.

According to some embodiments, indexing component 345 indexes the image based on the updated attribute tag confidence score. In some cases, the indexing component 345 indexes the determined attribute tags associated with the image. Indexing component 345 is an example of, or includes aspects of, the corresponding element described with reference to FIG. 4.

FIG. 4 shows an example of an image-tagging diagram according to aspects of the present disclosure. The example shown includes user 400, thumbnail component 405, auto-tagger 410, problematic tag component 415, object detection network 420, tag merging component 425, indexing component 430, database 435, and search component 440. User 400 is an example of, or includes aspects of, the corresponding element described with reference to FIG. 1.

In one example, a user 400 uploads an image, and a thumbnail is generated by the thumbnail component 405. 2K features are extracted on the thumbnail to generate image tags (e.g., Hashtag2-Tag-Worker) using the auto-tagger 410. Thumbnail component 405 and auto-tagger 410 are examples of, or includes aspects of, the corresponding element described with reference to FIG. 3. Alternatively, the image from the user may be input to a cropping component to determine the cropped parts of the image. The cropped parts of the image may then be input to an auto-tagger 410.

Attribute tags are determined to be problematic by the problematic tag component 415. Problematic tag component 415 is an example of, or includes aspects of, the corresponding element described with reference to FIG. 3. If the attribute tags (e.g., dog, cat, woman, man) from general image-based tagger are problematic, localized inference is used through a special branch and the problematic tags are sent to the object detection network 420 for a secondary tagging operation. Object detection network 420 is an example of, or includes aspects of, the corresponding element described with reference to FIG. 3.

If problematic tags are present in a given image, attribute tags and attribute tag confidence scores are determined by the object detection network 420. The tags from the auto-tagger 410 and the object detection network 420 are merged by the tag merging component 425 using a normalization and/or a boosting technique. The boosting technique may increase the confidence scores of low threshold tags. A penalization technique may reduce the confidence scores of problematic attribute tags which are above the predetermined threshold. Tag merging component 425 is an example of, or includes aspects of, the corresponding element described with reference to FIG. 3.

The merged tags are provided to the indexing component 430 to be organized and stored on the database 435. Indexing component 430 is an example of, or includes aspects of, the corresponding element described with reference to FIG. 3. The indexed tags may then be searched using the search component 440. According to some embodiments, search component 440 receives a search query relating to the attribute tag. In some examples, search component 440 retrieves the image from the database 435 based on the search query.

If a tag is determined to not be problematic, the tag is provided directly to the indexing component 430, stored on the database 435, and may then be searched for using the search component 440. Database 435 is an example of, or includes aspects of, the corresponding element described with reference to FIG. 1.

Attribute Tags

Figure 5:
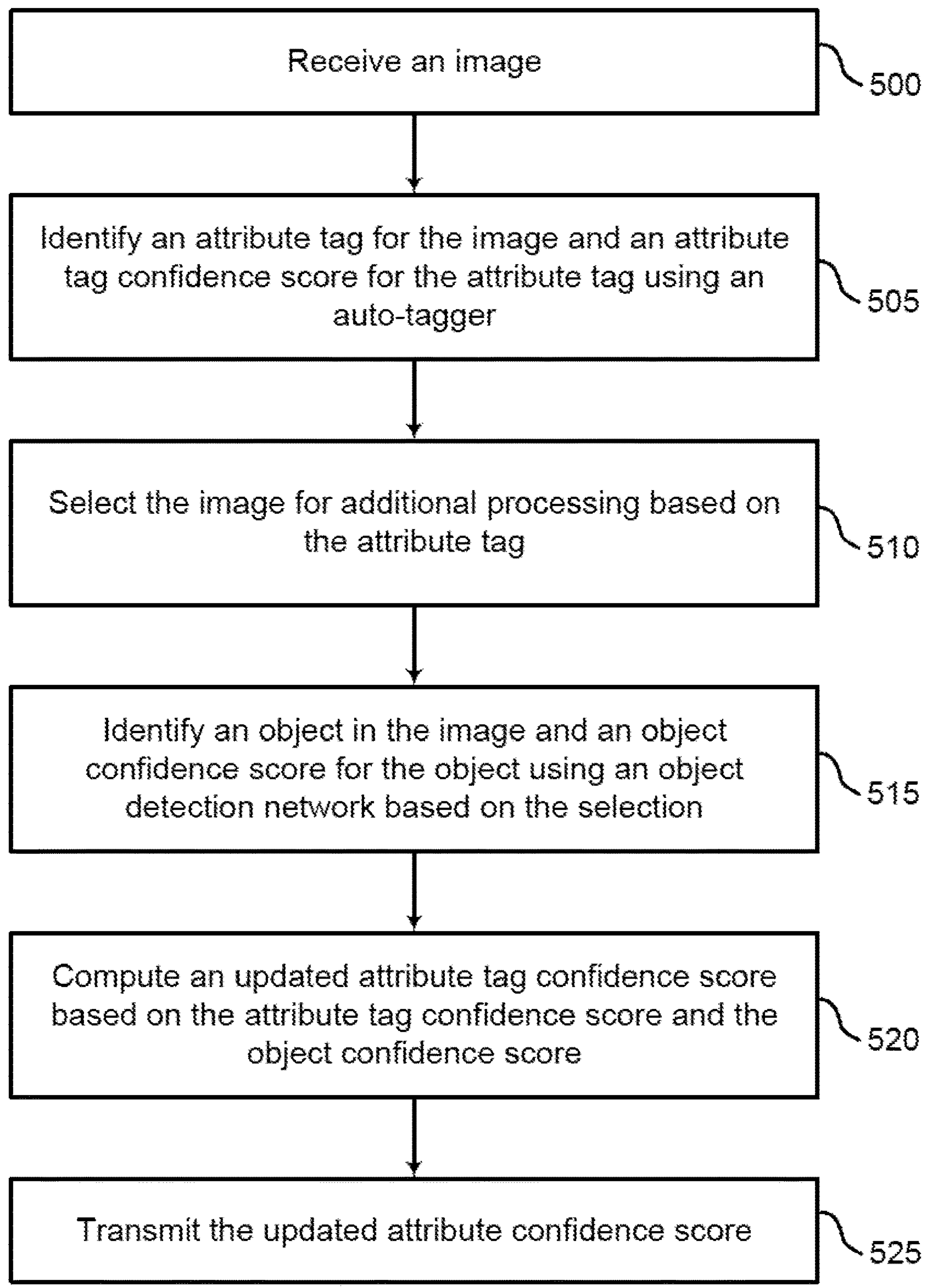
FIG. 5 shows an example of a process for image tagging according to aspects of the present disclosure.
Figure 6:
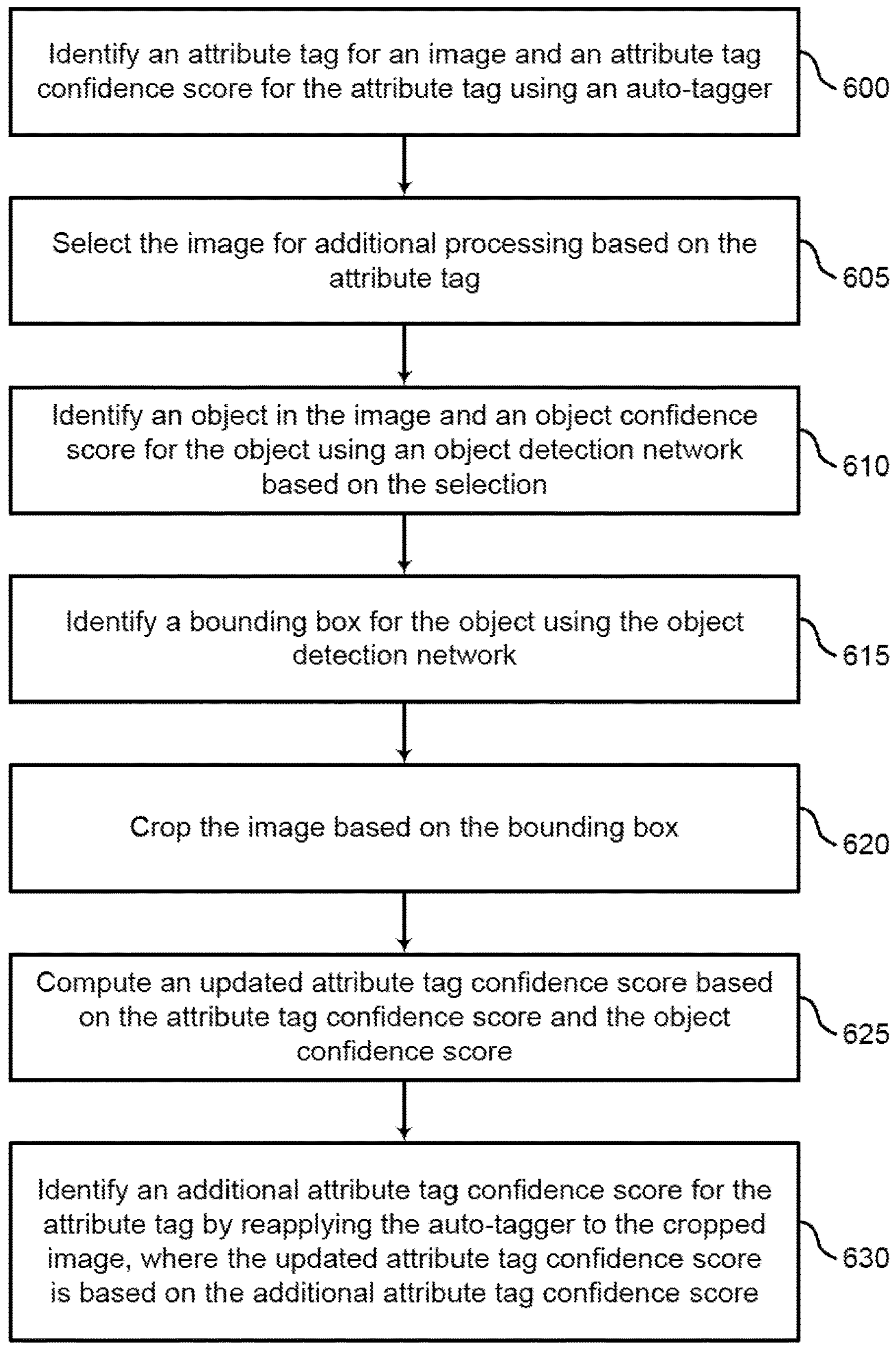
FIG. 6 shows an example of a process for enhancing auto-tagging accuracy according to aspects of the present disclosure.

In FIGS. 5 and 6, a method, apparatus, non-transitory computer-readable medium, and system for image-tagging are described. One or more embodiments of the method, apparatus, non-transitory computer-readable medium, and system include receiving an image, identifying an attribute tag for the image and an attribute tag confidence score for the attribute tag using an auto-tagger, selecting the image for additional processing based on the attribute tag, identifying an object in the image and an object confidence score for the object using an object detection network based on the selection, computing an updated attribute tag confidence score based on the attribute tag confidence score and the object confidence score, and transmitting the updated attribute confidence score.

Some examples of the method, apparatus, non-transitory computer-readable medium, and system described above further include receiving a high-resolution version of the image. Some examples further include generating a low-resolution version of the image, wherein the attribute tag is identified based on the low-resolution version and the object is identified based on the high-resolution version.

Some examples of the method, apparatus, non-transitory computer-readable medium, and system described above further include identifying a bounding box for the object using the object detection network. Some examples further include cropping the image based on the bounding box. Some examples further include identifying an additional attribute tag confidence score for the attribute tag by reapplying the auto-tagger to the cropped image, wherein the updated attribute tag confidence score is based on the additional attribute tag confidence score.

Some examples of the method, apparatus, non-transitory computer-readable medium, and system described above further include indexing the image based on the updated attribute tag confidence score. Some examples further include storing the indexed image in a database.

Some examples of the method, apparatus, non-transitory computer-readable medium, and system described above further include receiving a search query relating to the attribute tag. Some examples further include retrieving the image from the database based on the search query.

Some examples of the method, apparatus, non-transitory computer-readable medium, and system described above further include identifying a set of problematic tags. Some examples further include determining that the attribute tag is included in the set of problematic tags, wherein the image is selected for additional processing based on the determination.

Some examples of the method, apparatus, non-transitory computer-readable medium, and system described above further include determining an attribute frequency for each of a plurality of tags, wherein the set of problematic tags is identified based on the attribute frequency.

Some examples of the method, apparatus, non-transitory computer-readable medium, and system described above further include determining that the object corresponds to the attribute tag. Some examples further include multiplying the object confidence score by a boost parameter to produce a weighted object confidence score. Some examples further include adding the attribute tag confidence score and the weighted object confidence score to produce the updated attribute tag confidence score.

Some examples of the method, apparatus, non-transitory computer-readable medium, and system described above further include determining that attribute tag does not correspond to any detectable object in a list of objects detectable by the object detection network. Some examples further include retaining the attribute tag confidence score for the attribute tag based on the determination.

Some examples of the method, apparatus, non-transitory computer-readable medium, and system described above further include determining that the object does not correspond to the attribute tag. Some examples further include retaining the attribute tag confidence score for the attribute tag based on the determination. In some examples, when the object detection network identifies an object that does not correspond to the attribute tag, the confidence score for the attribute tag can be penalized or reduced and a new attribute tag corresponding to the identified object can be added.

FIG. 5 shows an example of a process for image tagging according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 500, the system receives an image. In an example scenario, an image of buildings, a tree, a table, and the sun may be received by the system. In some cases, the operations of this step refer to, or may be performed by, an auto-tagger as described with reference to FIGS. 3 and 4.

At operation 505, the system identifies an attribute tag for the image and an attribute tag confidence score for the attribute tag using an auto-tagger. The attribute tag is a keyword that is associated with an object in the image. For example, an image of a dog may yield attribute tags such as 'dog', 'golden retriever', or 'animal'. An attribute tag confidence score is a value used to provide a measurement of accuracy or confidence for a given attribute tag (or for the results of an object detection). In some cases, the operations of this step refer to, or may be performed by, an auto-tagger as described with reference to FIGS. 3 and 4.

At operation 510, the system selects the image for additional processing based on the attribute tag. In some cases, the operations of this step refer to, or may be performed by, a problematic tag component as described with reference to FIGS. 3 and 4.

At operation 515, the system identifies an object in the image and an object confidence score for the object using an object detection network based on the selection. For example, in an image of a dog, the system may provide a tag of 'dog' with object confidence score of 0.7, where the value of the confidence score is analogous to how certain the system is with the tag. In some cases, the operations of this step refer to, or may be performed by, an object detection network as described with reference to FIGS. 3 and 4.

At operation 520, the system computes an updated attribute tag confidence score based on the attribute tag confidence score and the object confidence score. In some cases, the operations of this step refer to, or may be performed by, a tag merging component as described with reference to FIGS. 3 and 4.

At operation 525, the system transmits the updated attribute confidence score. In some cases, the operations of this step refer to, or may be performed by, a tag merging component as described with reference to FIGS. 3 and 4.

FIG. 6 shows an example of a process for enhancing auto-tagging accuracy according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the system identifies an attribute tag for an image and an attribute tag confidence score for the attribute tag using an auto-tagger. In some cases, the operations of this step refer to, or may be performed by, an auto-tagger as described with reference to FIGS. 3 and 4.

At operation 605, the system selects the image for additional processing based on the attribute tag. In some cases, the operations of this step refer to, or may be performed by, a problematic tag component as described with reference to FIGS. 3 and 4.

At operation 610, the system identifies an object in the image and an object confidence score for the object using an object detection network based on the selection. For example, in an image of a dog, the system may provide a tag of 'dog' with an object confidence score of 0.7, where the value of the confidence score is analogous to how certain the system is with the tag. In some cases, the operations of this step refer to, or may be performed by, an object detection network as described with reference to FIGS. 3 and 4.

At operation 615, the system identifies a bounding box for the object using the object detection network. In some cases, the operations of this step refer to, or may be performed by, an object detection network as described with reference to FIGS. 3 and 4.

At operation 620, the system crops the image based on the bounding box. In some cases, the operations of this step refer to, or may be performed by, an object detection network as described with reference to FIGS. 3 and 4.

At operation 625, the system computes an updated attribute tag confidence score based on the attribute tag confidence score and the object confidence score. In some cases, the operations of this step refer to, or may be performed by, a tag merging component as described with reference to FIGS. 3 and 4.

At operation 630, the system identifies an additional attribute tag confidence score for the attribute tag by reapplying the auto-tagger to the cropped image, where the updated attribute tag confidence score is based on the additional attribute tag confidence score. In some cases, the operations of this step refer to, or may be performed by, an auto-tagger as described with reference to FIGS. 3 and 4.

Training

Figure 7:
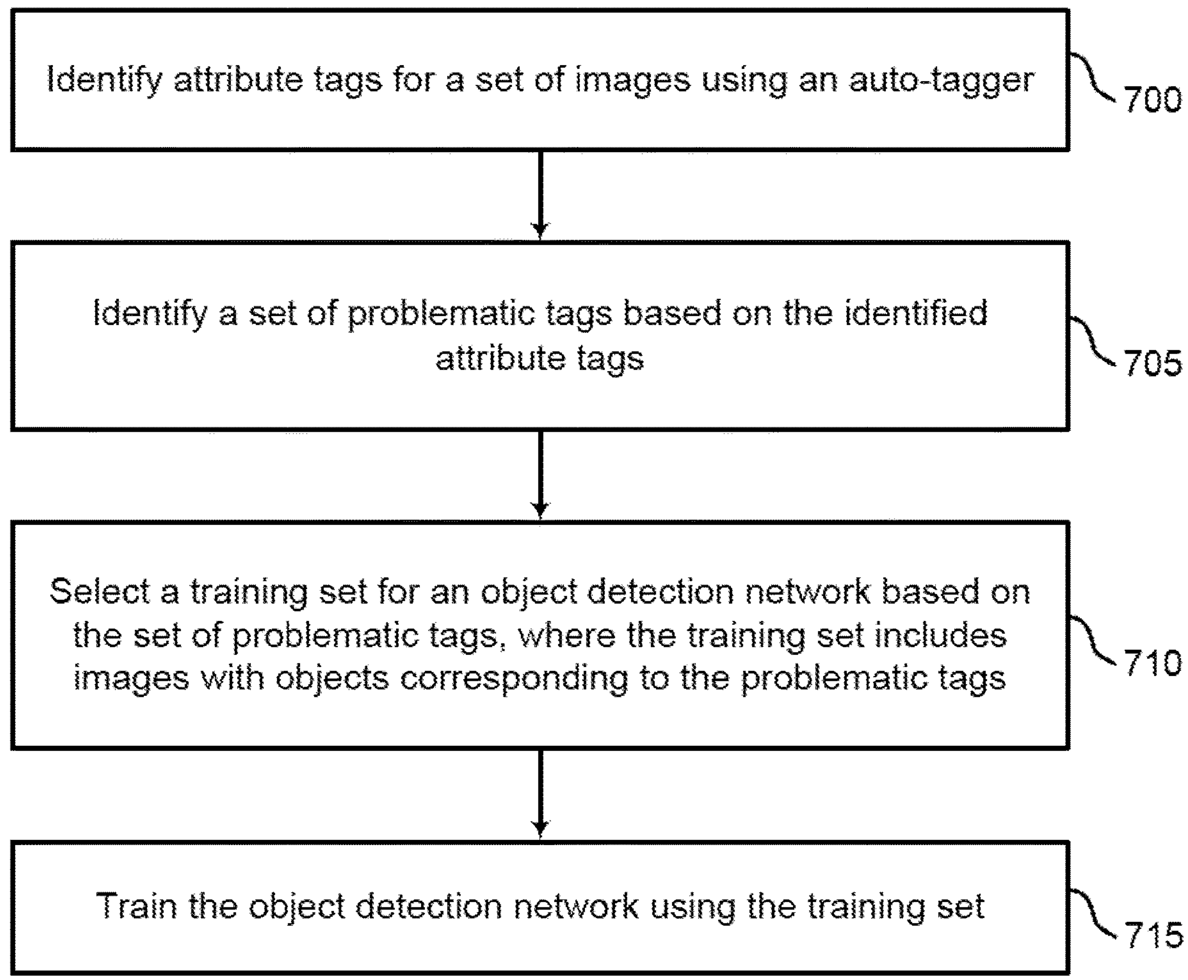
FIG. 7 shows an example of a process for training the object detection network according to aspects of the present disclosure.
Figure 8:
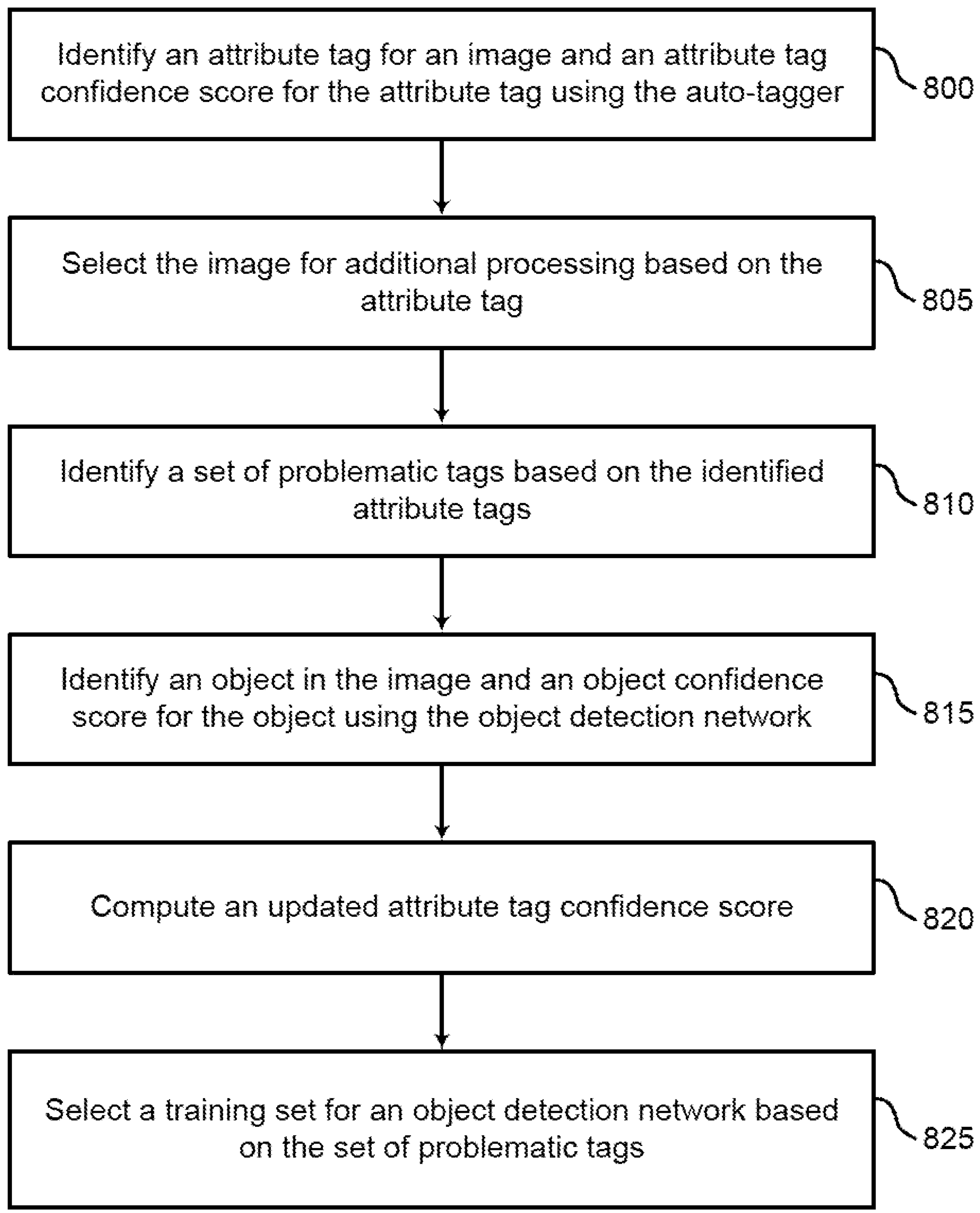
FIG. 8 shows an example of a process for selecting a training set according to aspects of the present disclosure.

In FIGS. 7 and 8, a method, apparatus, non-transitory computer-readable medium, and system for training a neural network for image-tagging are described. One or more embodiments of the method, apparatus, non-transitory computer-readable medium, and system include identifying attribute tags for a plurality of images using an auto-tagger, identifying a set of problematic tags based on the identified attribute tags, selecting a training set for an object detection network based on the set of problematic tags, wherein the training set includes images with objects corresponding to the problematic tags, and training the object detection network using the training set.

Some examples of the method, apparatus, non-transitory computer-readable medium, and system described above further include identifying ground truth objects for the training set. Some examples further include detecting objects in the training set using the object detection network. Some examples further include computing a loss function by comparing the ground truth objects and the detected objects, wherein the object detection network is trained based on the loss function.

Some examples of the method, apparatus, non-transitory computer-readable medium, and system described above further include determining an attribute frequency for each of the attribute tags, wherein the set of problematic tags is identified based on the attribute frequency.

Some examples of the method, apparatus, non-transitory computer-readable medium, and system described above further include determining a classification error frequency for each of the attribute tags, wherein the set of problematic tags is identified based on the classification error frequency.

Some examples of the method, apparatus, non-transitory computer-readable medium, and system described above further include identifying an attribute tag for an image and an attribute tag confidence score for the attribute tag using the auto-tagger. Some examples further include selecting the image for additional processing based on the attribute tag. Some examples further include identifying an object in the image and an object confidence score for the object using the object detection network based on the selection. Some examples further include computing an updated attribute tag confidence score based on the attribute tag confidence score and the object confidence score.

FIG. 7 shows an example of a process for training the object detection network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

The object detection network is trained on a complete training set in a stacking model concept and a meta-model is trained on the outputs of the base level model as features. One or more embodiments of the present disclosure combine two or more fully trained models to outperform the other models and costs less than replacing an entire model in a system.

At operation 700, the system identifies attribute tags for a set of images using an auto-tagger. For example, an image of a dog may yield attribute tags such as 'dog', 'golden retriever', or 'animal'. An attribute tag confidence score is a value used to provide a measurement of accuracy or confidence for a given attribute tag (or for the results of an object detection). In some cases, the operations of this step refer to, or may be performed by, a training component as described with reference to FIG. 3.

At operation 705, the system identifies a set of problematic tags based on the identified attribute tags. For example, the system may identify both false negatives (i.e., when the set of problematic tags have a confidence score below a predetermined threshold) and false positives (i.e., when the set of problematic tags have a confidence score above a predetermined threshold). In some cases, the operations of this step refer to, or may be performed by, a training component as described with reference to FIG. 3.

At operation 710, the system selects a training set for an object detection network based on the set of problematic tags, where the training set includes images with objects corresponding to the problematic tags. In some cases, the operations of this step refer to, or may be performed by, a training component as described with reference to FIG. 3.

At operation 715, the system trains the object detection network using the training set. In some cases, the operations of this step refer to, or may be performed by, a training component as described with reference to FIG. 3.

FIG. 8 shows an example of a process for selecting a training set according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 800, the system identifies an attribute tag for an image and an attribute tag confidence score for the attribute tag using the auto-tagger. For example, an image of a dog may yield attribute tags such as 'dog', 'golden retriever', or 'animal'. An attribute tag confidence score is a value used to provide a measurement of accuracy or confidence for a given attribute tag (or for the results of an object detection). In some cases, the operations of this step refer to, or may be performed by, a training component as described with reference to FIG. 3.

At operation 805, the system selects the image for additional processing based on the attribute tag. In some cases, the operations of this step refer to, or may be performed by, a problematic tag component as described with reference to FIGS. 3 and 4.

At operation 810, the system identifies a set of problematic tags based on the identified attribute tags. For example, the set of problematic tags may have a confidence score below a predetermined threshold. In some cases, the operations of this step refer to, or may be performed by, a training component as described with reference to FIG. 3.

At operation 815, the system identifies an object in the image and an object confidence score for the object using the object detection network based on the selection. For example, in an image of a dog, the system may provide a tag of 'dog' with an object confidence score of 0.7, where the value of the confidence score is analogous to how certain the system is with the tag. In some cases, the operations of this step refer to, or may be performed by, an object detection network as described with reference to FIGS. 3 and 4.

At operation 820, the system computes an updated attribute tag confidence score based on the attribute tag confidence score and the object confidence score. In some cases, the operations of this step refer to, or may be performed by, a tag merging component as described with reference to FIGS. 3 and 4.

At operation 825, the system selects a training set for an object detection network based on the set of problematic tags, where the training set includes images with objects corresponding to the problematic tags. In some cases, the operations of this step refer to, or may be performed by, a training component as described with reference to FIG. 3.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

receiving an image;

identifying an attribute tag for the image and an attribute tag confidence score for the attribute tag using an auto-tagger;

selecting the image for additional processing based on the attribute tag being among a set of problematic tags;

identifying an object in the image and an object confidence score for the object using an object detection network based on the selection, wherein the object detection network comprises an artificial neural network trained on a training set selected to include images that include objects corresponding to the set of problematic tags;

computing an updated attribute tag confidence score based on the attribute tag confidence score and the object confidence score; and transmitting the updated attribute tag confidence score in response to receiving the image.

2. The method of claim 1, further comprising:

receiving a high-resolution version of the image; and generating a low-resolution version of the image, wherein the attribute tag is identified based on the low-resolution version and the object is identified based on the high-resolution version.

3. The method of claim 1, further comprising:

identifying a bounding box for the object using the object detection network;

cropping the image based on the bounding box; and identifying an additional attribute tag confidence score for the attribute tag by reapplying the auto-tagger to the cropped image, wherein the updated attribute tag confidence score is based on the additional attribute tag confidence score.

4. The method of claim 1, further comprising:

indexing the image based on the updated attribute tag confidence score; and storing the indexed image in a database.

5. The method of claim 4, further comprising:

receiving a search query relating to the attribute tag; and retrieving the image from the database based on the search query.

6. The method of claim 1, wherein:

the set of problematic tags are a set of attribute tags that the auto-tagger does not reliably identify and that result in false negatives and false positives.

7. The method of claim 6, further comprising:

determining a classification error frequency for each of a plurality of tags, wherein the set of problematic tags is identified based on the classification error frequency.

8. The method of claim 1, further comprising:

determining that the object corresponds to the attribute tag;

multiplying the object confidence score by a boost parameter to produce a weighted object confidence score; and adding the attribute tag confidence score and the weighted object confidence score to produce the updated attribute tag confidence score.

9. The method of claim 1, further comprising:

determining that the attribute tag does not correspond to any detectable object in a list of objects detectable by the object detection network; and retaining the attribute tag confidence score for the attribute tag based on the determination.

10. The method of claim 1, further comprising:

identifying a detectable object corresponding to the attribute tag, wherein the detectable object is detectable by the object detection network;

determining that the detectable object has not been detected by the object detection network; and reducing the attribute tag confidence score based on the determination.

11. An apparatus comprising:

an auto-tagger configured to identifying an attribute tag for an image and an attribute tag confidence score for the attribute tag;

a problematic tag component configured to select the image for additional processing based on the attribute tag being among the set of problematic tags;

an object detection network configured to identify an object in the image and an object confidence score for the object, wherein the object detection network comprises an artificial neural network trained on a training set selected to include images that include objects corresponding to a set of problematic tags; and a tag merging component configured to compute an updated attribute tag confidence score based on the attribute tag confidence score and the object confidence score.

12. The apparatus of claim 11, further comprising:

a thumbnail component configured to produce a low resolution version of the image.

13. The apparatus of claim 11, further comprising:

an indexing component configured to index the image based on the updated attribute tag confidence score; and a database configured to store the image based on the indexing.

14. The apparatus of claim 13, further comprising:

a search component configured to retrieve the image from the database based on the indexing.

15. The apparatus of claim 11, wherein:

the object detection network is configured to produce a bounding box for the object.

16. A method of training an object detection network, the method comprising:

identifying attribute tags for a plurality of images using an auto-tagger;

identifying a set of problematic tags based on the identified attribute tags;

selecting a training set for the object detection network based on the set of problematic tags, wherein the training set includes images with objects corresponding to the set of problematic tags;

training the object detection network using the training set;

identifying an attribute tag for an image and an attribute tag confidence score for the attribute tag using the auto-tagger;

selecting the image for additional processing based on the attribute tag;

identifying an object in the image and an object confidence score for the object using the trained object detection network based on the selection; and computing an updated attribute tag confidence score based on the attribute tag confidence score and the object confidence score.

17. The method of claim 16, further comprising:

identifying ground truth objects for the training set;

detecting objects in the training set using the object detection network; and computing a loss function by comparing the ground truth objects and the detected objects, wherein the object detection network is trained based on the loss function.

18. The method of claim 16, further comprising:

determining an attribute frequency for each of the attribute tags, wherein the set of problematic tags is identified based on the attribute frequency.

19. The method of claim 16, further comprising:

determining a classification error frequency for each of the attribute tags, wherein the set of problematic tags is identified based on the classification error frequency.

* * * * *